FRANK BROWN. Improvement in Horse Hay Rakes.
No. 123,081. Patented Jan. 30, 1872.
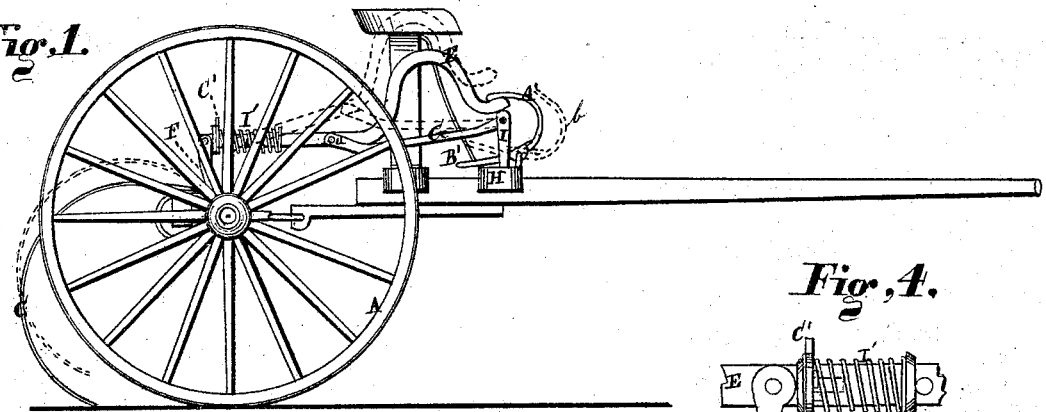
Fig. 1.
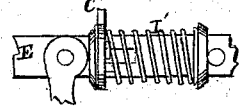
Fig. 4.
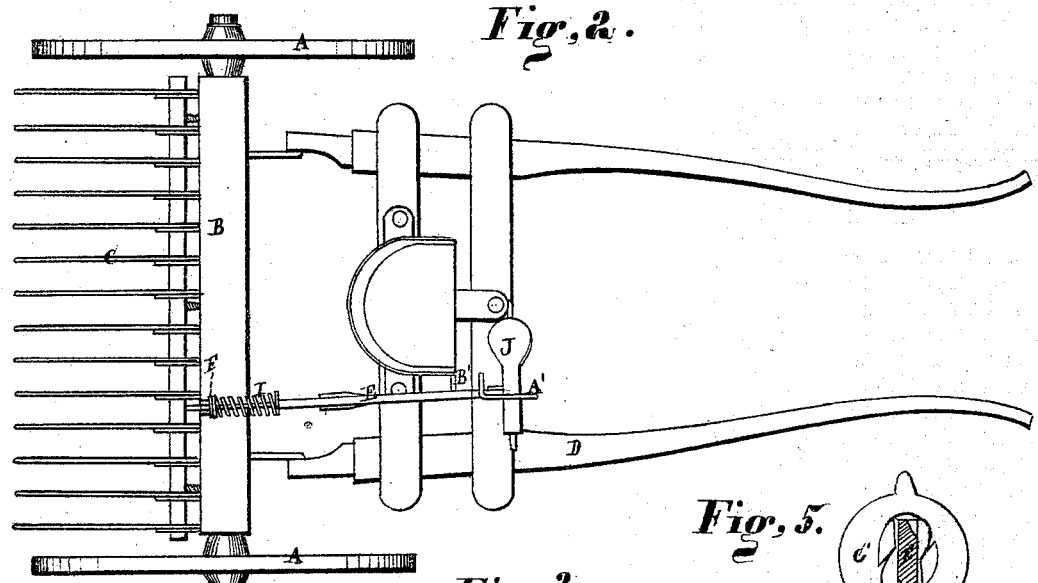
Fig. 2.
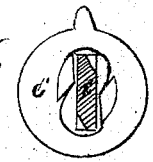
Fig. 5.
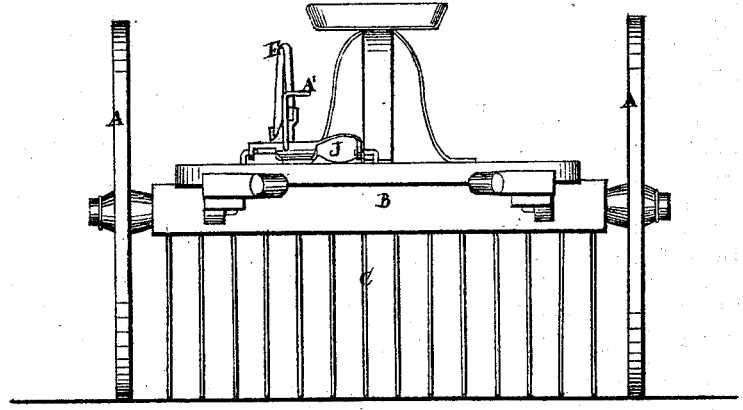
Fig. 3.
Fig. 6.
Witnesses. Inventor.
F. Brown
Per Burnside & Co.
Attys.
AM. PHOTO-LITHOGRAPHIC CO. N.Y. (OSBORNE'S PROCESS.)

123,081

UNITED STATES PATENT OFFICE.

FRANK BROWN, OF RUSSELL, OHIO.

IMPROVEMENT IN HORSE HAY-RAKES.

Specification forming part of Letters Patent No. 123,081, dated January 30, 1872.

*To all whom it may concern:*

Be it known that I, FRANK BROWN, of Russell, in the county of Geauga and State of Ohio, have invented a certain new and Improved Horse-Rake; and I do hereby declare that the following is a full, clear, and complete description thereof, reference being had to the accompanying drawing making part of the same.

SPECIFICATION.

Figure 1 is a side elevation of the rake. Fig. 2 is a top view. Fig. 3 is a front view. Figs. 4, 5, and 6 are detached sections.

Like letters of reference refer to like parts in the several views.

The nature of this invention relates to a pair of links pivoted to each other and both secured in position for holding down the rake while in use by a hook, said hook being operated by a treadle for discharging the hay from the rake, as hereinafter more fully described. It also relates to a device for relieving the rake from any sudden and unusual strain that may be exerted upon it. Said device consists of a link and collar placed thereon, the link being pivoted to the axle-tree or head of the rake by means of a slot in the end of the link for the pivotal pin to work in, and which is prevented from a too free movement by a spring, and is locked in position, when desired, by means of the collar and notches; all of which is hereinafter more fully described.

In the drawing, A represents the wheels of the machine, and B the axle-tree, to which the rake C is attached, and which also forms the head thereof. To the axle-tree is attached the thills D, whereby the rake is drawn, all of which is or may be constructed in the usual way. E, Fig. 1, is a link, the front end of which is curved in the manner as shown, whereas the opposite end is straight and is connected to the axle-tree by means of a standard, F, to which the link is pivoted, a slot, *a*, Fig. 6, being cut in the end of the link, in which is inserted the pivotal pin. Said slot allows the link to slide endwise in the standard, as and for the purpose presently shown. G, Fig. 1, is also a link, the front end of which is attached to the cross-bar H of the thills by means of a standard, I, in which the link is pivoted, as shown in said Fig. 1; whereas the opposite end of the link is pivoted to the link E at the point *a*. Secured to the cross-bar H is a treadle, J, Fig. 2, from the front side of which projects a hook, A', and from its rear side an arm, B', as shown in the side view, Fig. 1. The use of said treadle, hook, and arm will hereinafter be shown.

The operation of the above-described tripping device is as follows: The position of the rake, as shown in Fig. 1, is such as when it is in use, and which is thus secured by the hook A', the upper end of which is made to lap over onto the end of the link E, as shown, thereby holding it down and preventing the rake from being raised from the ground while gathering the hay. When the rake is full and ready for being discharged the operator places his foot upon the treadle J and turns it downward, thereby throwing the hook from its engagement with the link, as indicated by the dotted lines *b*, Fig. 1. While thus disengaging the hook from the link the arm B' is brought in contact with the link G, which is thereby raised upward, as indicated by the dotted line *c*. The upward movement of the links draws upward the rake and the teeth from out the hay, which is left on the ground in windrows. The rake, when passed over the raked hay, is then dropped upon the ground and secured by the hook catching on the end of the link E, as aforesaid. The weight of the rake is enough to cause it to drop, whereas it is lifted by the foot operating the treadle, which operation may be assisted by lifting upward with the hand the links E. This manner of operating the rake is quickly and conveniently done, and with but little fatigue to the operator, as the hand and foot may be both jointly employed to discharge the rake.

As above said, the end of the link E is attached to the standard F by a pin passing through a slot in the end of the link. The object of the slot is to allow the rake to rise a little above the ground in the event the teeth should strike against some obstruction, which, if the rake could not be relieved by some slight upward movement, the teeth would be liable to straighten by the force of the blow. This slight upward movement of the rake takes place without effecting the locked position of the tripping-links; hence the rake will not be lifted so far from the ground as to discharge the hay should the teeth meet such obstruction as referred to. The coiled spring I' resists the ordinary strain exerted on the rake while in use, but will yield to some unusual force and allow the rake to rise some little from the ground, as aforesaid. The rake can be held from yielding to any obstructive force by turning the collar C', Figs. 4 and 5, around on the end of the link, which will bring the side of the hole in said collar into a notch or notches, e, Fig. 6, cut in the edge of the link, and thereby prevent the collar from being forced back over the link and lifting the rake. The rake, thus conditioned, will be rigid as regard to any accidental or obstructive force, but which will in no way effect its tripping capacity for discharging the hay by means of the complication of levers and treadles above described.

*Claims.*

What I claim as my invention, and desire to secure by Letters Patent, is—

1. The combination, with the link E, the hook A', arm B', and treadle J, in the manner substantially as described, and for the purpose specified.

2. The spring I', slot a, and notches e in the end of the link E and collar C', constructed and arranged to operate, in combination with the rake C, in the manner as and for the purpose specified.

FRANK BROWN.

Witnesses:
W. H. BURRIDGE,
D. L. HUMPHREY.